United States Patent [19]
Endo et al.

[11] Patent Number: 5,488,598
[45] Date of Patent: Jan. 30, 1996

[54] OPTICAL PICKUP USING SPLIT BEAMS IMPINGING ON DIFFERENT PHOTODETECTOR AREAS

[75] Inventors: Kiyonobu Endo; Kazuya Matsumoto; Tetsuro Kuwayama, all of Yokohama, Japan

[73] Assignee: Canon Kabushiki Kaisha, Tokyo, Japan

[21] Appl. No.: 275,328

[22] Filed: Jul. 14, 1994

Related U.S. Application Data

[63] Continuation of Ser. No. 77,405, Jun. 16, 1993, abandoned, which is a continuation of Ser. No. 658,428, Feb. 20, 1991, abandoned, which is a continuation of Ser. No. 349,963, May 8, 1989, abandoned, which is a continuation of Ser. No. 832,651, Feb. 25, 1986, abandoned.

[30] Foreign Application Priority Data

Feb. 28, 1985 [JP] Japan ................................. 60-39050
Feb. 28, 1985 [JP] Japan ................................. 60-39051
Apr. 8, 1985 [JP] Japan ................................. 60-72733

[51] Int. Cl.⁶ .............................. G11B 7/00; G11B 11/00
[52] U.S. Cl. ................ 369/120; 369/44.23; 369/44.38; 369/44.37; 369/107
[58] Field of Search ................ 369/44.42, 44.23, 369/44.12, 120, 112, 44.32, 13, 44.37, 44.38, 107

[56] References Cited

U.S. PATENT DOCUMENTS

| | | | |
|---|---|---|---|
| 3,969,576 | 7/1976 | Boonstra et al. | 369/45 |
| 3,992,575 | 11/1976 | Velzel et al. | 369/45 |
| 4,422,168 | 12/1983 | Ito et al. | 369/44.24 |
| 4,425,043 | 1/1984 | Van Rosmalen | 369/44 |
| 4,445,208 | 4/1984 | Yamamoto et al. | 369/44 |
| 4,513,408 | 4/1985 | Nomura et al. | 369/46 |
| 4,533,826 | 8/1985 | Van Alem | 369/44.42 |
| 4,546,463 | 10/1985 | Opheij et al. | 369/46 |
| 4,558,440 | 12/1985 | Tomita | 360/114 |
| 4,561,032 | 12/1985 | Matsumoto et al. | 360/114 |
| 4,562,502 | 12/1985 | Ezaki et al. | 360/114 |
| 4,573,149 | 2/1986 | Deguchi et al. | 369/13 |
| 4,599,714 | 7/1986 | Endo | 369/13 |
| 4,626,679 | 12/1986 | Kuwayama et al. | 250/227.11 |
| 4,676,623 | 6/1987 | Akashi et al. | 250/578 |
| 4,742,218 | 5/1988 | Nakamura et al. | 369/44.42 |
| 4,816,665 | 3/1989 | Hsu | 369/44.42 |
| 5,005,162 | 4/1991 | Mitsumori et al. | 369/44.12 |
| 5,161,139 | 11/1992 | Inoue et al. | 369/44.23 |
| 5,287,338 | 2/1994 | Sato | 369/44.23 |
| 5,315,574 | 5/1994 | Saimi et al. | 369/44.37 |
| 5,416,755 | 5/1995 | Endo et al. | 369/13 |

FOREIGN PATENT DOCUMENTS

| | | | |
|---|---|---|---|
| 57-44241 | 3/1982 | Japan . | |
| 59-030255 | 2/1984 | Japan | 360/114 |
| 59-77649 | 5/1984 | Japan . | |
| 59-203259 | 11/1984 | Japan . | |

Primary Examiner—Georgia Y. Epps
Assistant Examiner—Kim-Kwok Chu
Attorney, Agent, or Firm—Fitzpatrick, Cella, Harper & Scinto

[57] ABSTRACT

An optical pickup apparatus having a photo-detection unit having a plurality of detectors, a unit for converting a light beam emitted from a recording medium on which information is magnetically recorded and intensity-modulated, and splitting the light beam into two beams guide them respectively onto different areas of the photo-detection unit, and a device for processing outputs from each area of the photo-detection unit to provide an information signal.

12 Claims, 11 Drawing Sheets

5,488,598

OPTICAL PICKUP USING SPLIT BEAMS IMPINGING ON DIFFERENT PHOTODETECTOR AREAS

This application is a continuation of application Ser. No. 08/077,405 filed Jun. 16, 1993, which is now abandoned, which is a continuation of application Ser. No. 07/658,428 filed Feb. 20, 1991, now abandoned, which is a continuation of application Ser. No. 07/349,963 filed May 8, 1989, now abandoned, which is a continuation of application Ser. No. 06/832,651 filed Feb. 25, 1986, which is now abandoned.

BACKGROUND OF THE INVENTION

1. Field of the Invention

The present invention relates to an optical pickup for irradiating a light beam on an information recording area of an information carrier to detect or record information, and more particularly to a compact, low cost optical pickup capable of reproducing a signal at a high S/N ratio.

2. Related Background Art

Research and development for a writable optical disk recording medium and an optical disk recording and reproducing apparatus have been vigorously prosecuted.

Examples of such apparatus are shown in U.S. Pat. No. 4,451,863 and IBM Technical Disclosure Bulletin Vol. 19, No. 4, issued September 1976.

However, such a prior art optical pickup has many parts and is disadvantageous as regards reduction in size and cost. Further, a plurality of photo-detectors must be accurately positioned and adjustment thereof is troublesome.

SUMMARY OF THE INVENTION

It is an object of the present invention to provide an optical pickup which is compact and easy to adjust optically. An optical pickup apparatus according to the present invention includes photodetection means having a plurality of detection areas. Means are provided for converting, into an electrical signal, a light beam emitted from a recording medium on which information is magnetically recorded and modulated in intensity. These means also split the light beam into two beams and guide them respectively to different areas of the photodetection means. Means are also provided for processing outputs from each of the areas of the photodetection means to provide an information signal.

DESCRIPTION OF THE PREFERRED EMBODIMENTS

Figure 1A:
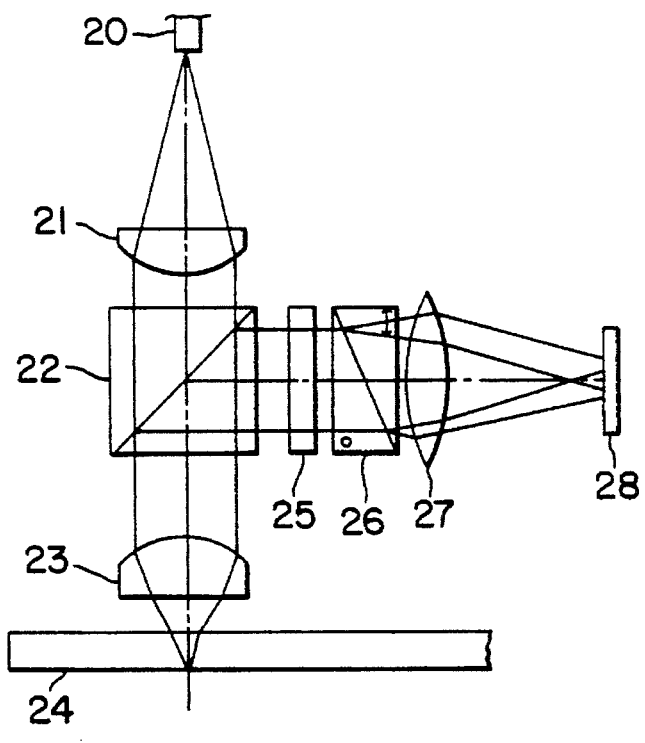
FIG. 1A shows a first embodiment of an optical pickup of the present invention.

FIG. 1A shows a first embodiment of an optical pickup according to the present invention. A light beam emitted from an LD 20 is collimated by a collimating lens 21, passes through a beam splitter 22 and is focused by an object lens 23 to a fine spot on a recording medium 24. A reflected light beam from the recording medium 24 again passes through an object lens 23, is reflected by the beam splitter 22, passes through a half-wave plate 25 with the direction of its plane of polarization being rotated by 45 degrees, and is directed to a Wollaston prism 26. As a result, the light beam is split into a linearly polarized light beam which vibrates in the plane of the drawing and a linearly polarized light beam which vibrates in a plane normal to that of the drawing; and both of the split beams are condensed by a sensor lens 27.

Figures 1B, 1C:
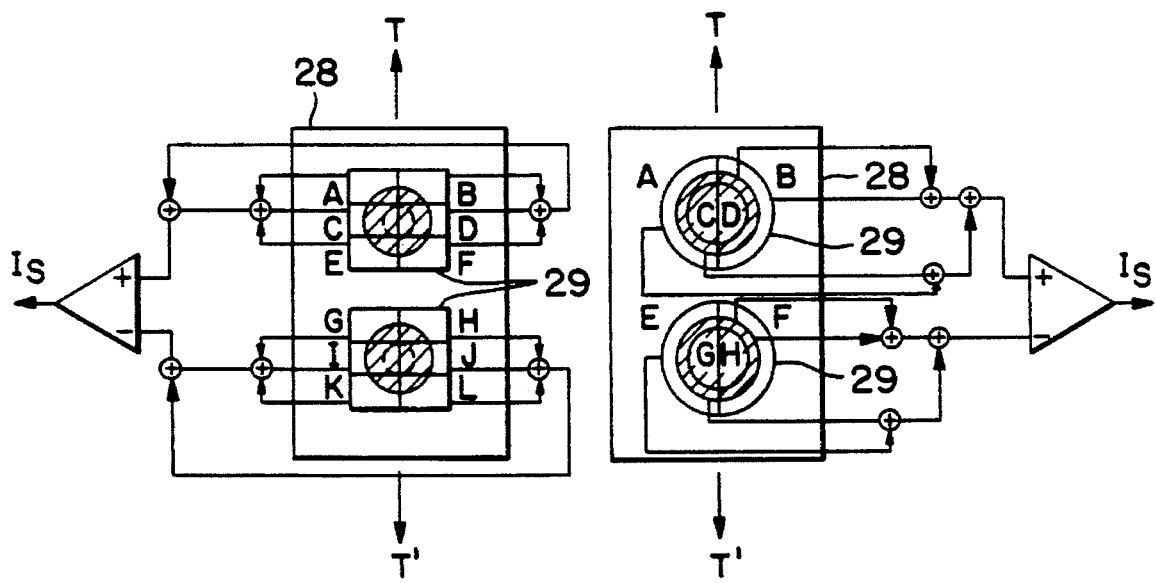
FIGS. 1B and 1C show enlarged views of photo-detectors used in the pickup of FIG. 1A.

FIGS. 1B and 1C show examples of split portions or areas of a photo-sensor of a photo-detector 28. When the object lens 23 and the recording medium 24 are in an in-focus position, the light beam spreads to the hatched areas shown in FIGS. 1B and 1C. Signal outputs $I_A$, $I_B$, $I_C$, $I_D$, $I_E$, and $I_F$, from the photo-sensors A–F, respectively, and a focus error signal $I_{AF1}$, have the following relationship.

$$I_{AF1}=(I_A+I_B+I_E+I_F)-(I_C+I_D)$$

In FIG. 1B, if the recording medium 24 moves away from the object lens 23, the light spot becomes smaller, as shown by a broken line in FIG. 1B. As a result, the outputs $I_C$ and $I_D$ increase and the focus error signal $I_{AF1}$ becomes negative. When the recording medium 24 moves nearer to the lens 23, the light spot on the photo-sensor 29 becomes larger and the focus error signal $I_{AF1}$ becomes positive.

When the concentric photo-sensors 29 shown in FIG. 1C are employed, a difference between the outer photo-sensor and the inner photo-sensor is used so that the focus error signal is detected in a similar manner.

On the other hand, a tracking error signal may be detected in the present invention by a known push-pull method, like that shown in U.S. Pat. No. 3,931,459. The tracking error signal may be detected by calculating $$I_{AF1}=(I_A+I_C+I_E)-(I_B+I_D+I_F)$$

A principle of differential detection of the opto-magnetic information signal by the optical pickup of the present invention is now explained.

In FIG. 1A, the reflected light from the recording medium 24 is directed to the half-wavelength plate 25 with the polarization plane thereof being rotated through an angle θK or −θK by the magnetic pattern of the recording medium 24 (direction of magnetization is either upward or downward) by the magneto-optical effect. The half-wavelength plate 25 has a crystal axis arranged at 22.5° with respect to a crystal axis of the Wollaston prism 26. Since the Wollaston prism 26 splits the reflected light beam into two linearly polarized light beams having vibration planes orthogonal to each other, those light beams are detected by the photo-sensor 28 as signals of opposite phases, as shown in FIG. 2.

Figure 2:
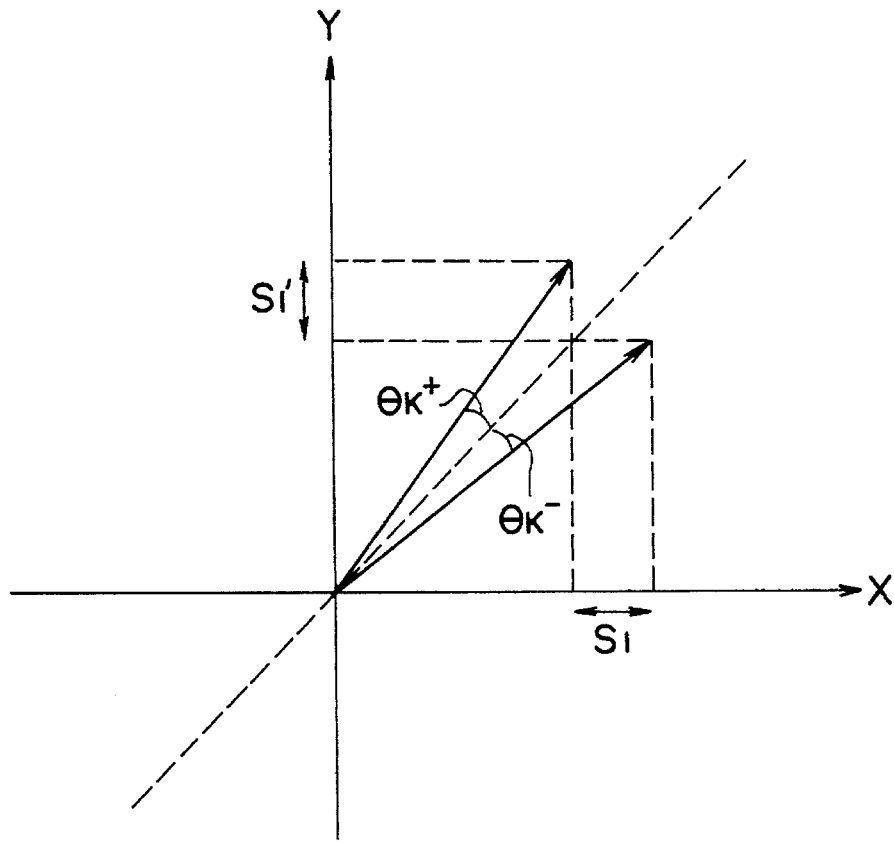
FIG. 2 shows signal amplitude components of a light beam.

In FIG. 2, the X axis represents a crystal axis of a first component of the prism of the Wollaston prism 26 and the Y axis represents a component normal thereto. The light beam rotated by θK or −θK from the polarization plane of the reflected light beam by the magneto-optical effect (a broken line in FIG. 2 shows the polarization plane) has its polarization plane rotated by 45° by the half-wavelength plate 25. Since it is thereafter divided in two by the Wollaston prism 26, the resulting light beams have an equal variation amplitude (S1 and S1') and opposite phases. By detecting those two light beams by means of the photo-sensors 29, the opto-magnetic signal of the recording medium 24 can be produced. In the photo-detector 28 of FIG. 1B, the opto-magnetic information signal $I_S$ is given by $$I_S=(I_A+I_B+I_C+I_D+I_E+I_F)-(I_G+I_H+I_I+I_J+I_K+I_L)$$

and in the photo-detector 28 of FIG. 1C, it is given by $$I_S=(I_A+I_B+I_C+I_D)-(I_E+I_F+I_G+I_H)$$

In accordance with the present embodiment, the size and weight of the apparatus are reduced and the reliability is improved. Since a set of photo-sensors 29 which differentially detect the light beams are arranged on one substrate, the photo-detector 28 is insensitive to external changes such as a change of environmental temperature.

By arranging a set of amplifiers on the same substrate as the photo-detectors, the frequency characteristics and temperature characteristics of those circuits are well matched and signal quality is further improved. By incorporating the differential amplifier for differentially detecting the signals in the photo-detector, noise-resistant detection is attained.

In the present embodiment, the half-wave plate 25 is arranged to facilitate the arrangement and fine adjustment of the optical system. The same effect can be attained when the crystal axis of the prism is oriented to 45° and the photo-detector is arranged with respect thereto.

Figure 3:
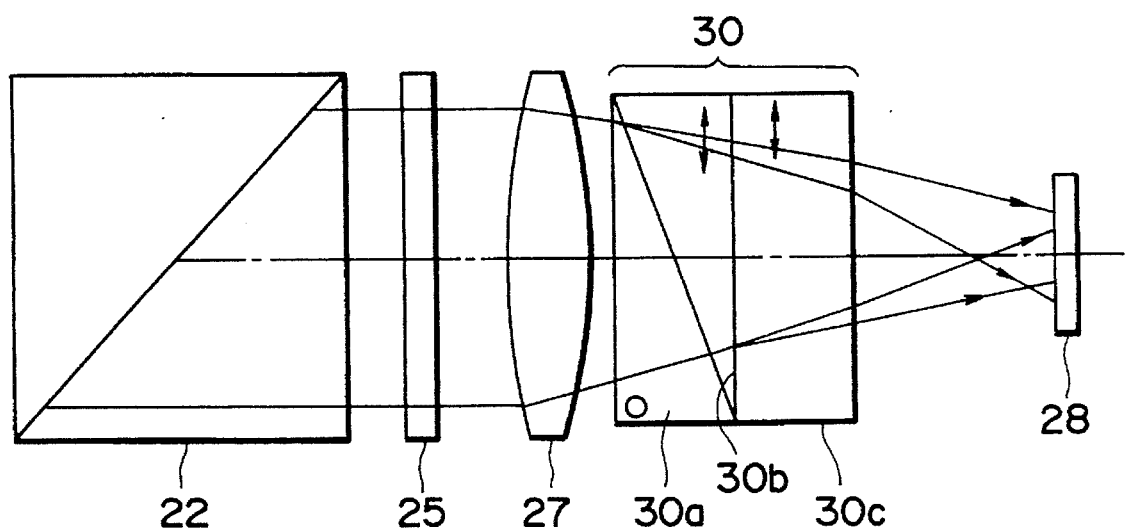
FIG. 3 shows a modification of the first embodiment of the present invention, FIG. 4, consisting of FIGS. 4A, 4B and 4C, shows focus error signals.

A modification of the first embodiment of the present invention is shown in FIG. 3. The light beam reflected by the beam splitter 22 and transmitted through the half-wave plate 25 (optical elements in front of the beam splitter 22 are omitted in FIG. 3) is condensed by a condenser lens 27, and the condensed beam is directed to a polarization/separation element 30 comprising two prisms 30a and 30b having crystal axes orthogonal to each other (which form a Wollaston prism) and a polarization plate 30c having the same crystal axis as that of the prism 30b. The light beam transmitted through the polarization/separation element 30 propagates in different directions for an ordinary ray and an extraordinary ray, and an equivalent optical thickness changes with a difference between refractive indices No and Ne for the ordinary ray and the extraordinary ray. Accordingly, focusing positions for the ordinary ray and extraordinary ray are different. Thus, the photo-sensor 29 of the photo-detector 28 is arranged at an unfocused position for the light beam of one polarization direction and in the diverging light beam after focusing for the other light beam.

Figure 4A:
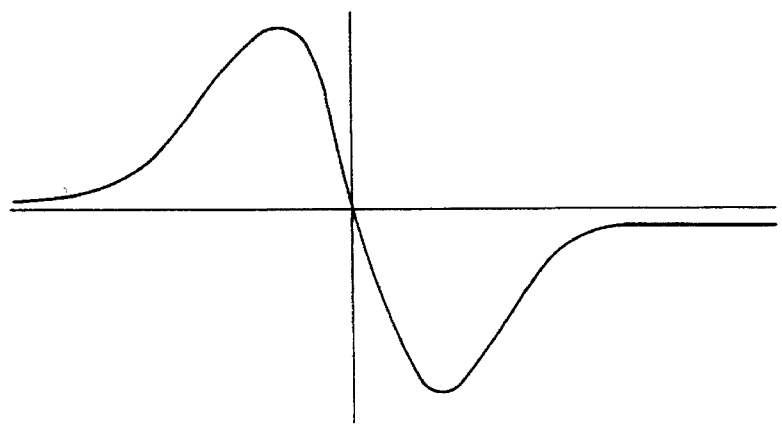
Figure 4B:
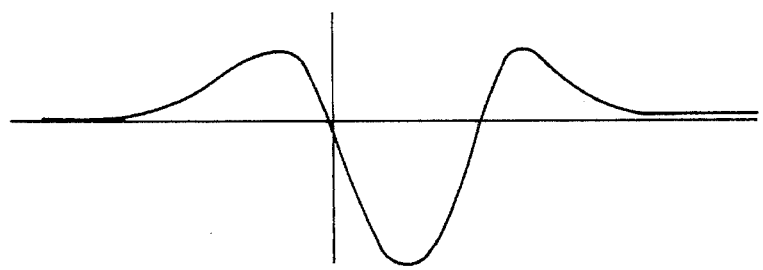
Figure 4C:
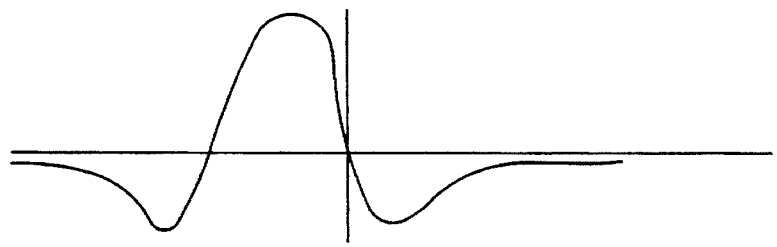

FIG. 4A shows a focus error signal produced in FIG. 3. FIGS. 4B and 4C show focus error signals produced by a single concentric circular photo-detector. They have undesirable side peaks to an ideal S-curve. In the embodiment of FIG. 3 which uses the combination of converging and diverging photo-detectors, the undesired peak is eliminated as shown in FIG. 4A and a desirable S-shaped focus error signal is produced. In FIG. 3, an interval between the two light spots on the photo-detector 28 can be finely adjusted by moving the Wollaston prism (30a and 30b) back and forth.

Figure 5:
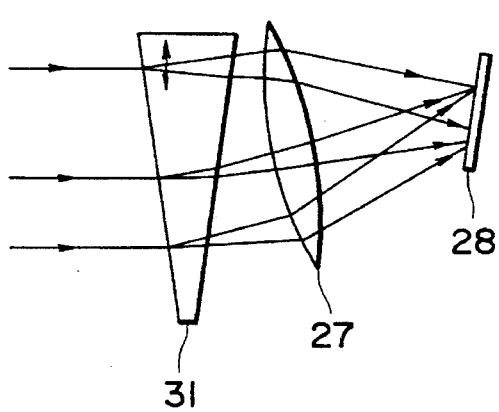
FIGS. 5, 6, 7 and 8 show other modifications of the first embodiment of the present invention.

Another modification of the first embodiment of the present invention is shown in FIG. 5. The light beam from the beam splitter (not shown in FIG. 5) is separated into an ordinary ray and an extraordinary ray by a prism 31 formed of crystal and is focused onto the photo-detector 28 by the focusing lens 27. The photo-detector 28 may be arranged obliquely to the light beam by an appropriate angle.

Figure 6:
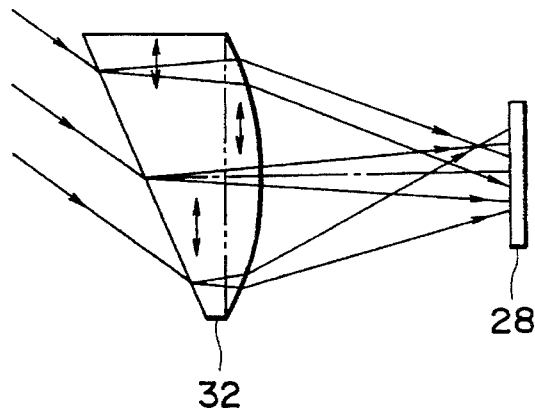

Not only the prism but also the focusing lens 27 may be manufactured of crystal. FIG. 6 shows an example thereof. An optical element 32 has a prism on one side and a lens on the other side. As a result, converging and diverging light beams separated in accordance with the polarization status of the incident light are directed to the photo-detector 28.

Figure 7:
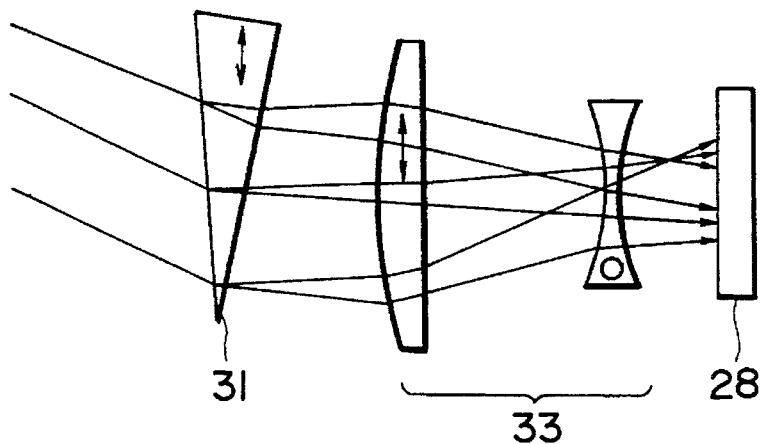

FIG. 7 shows a modification in which the focusing lens 27 is substituted by a teletype telescopic lens 33. With this arrangement, the light beams necessary for the differential direction are finely separated.

Figure 8:
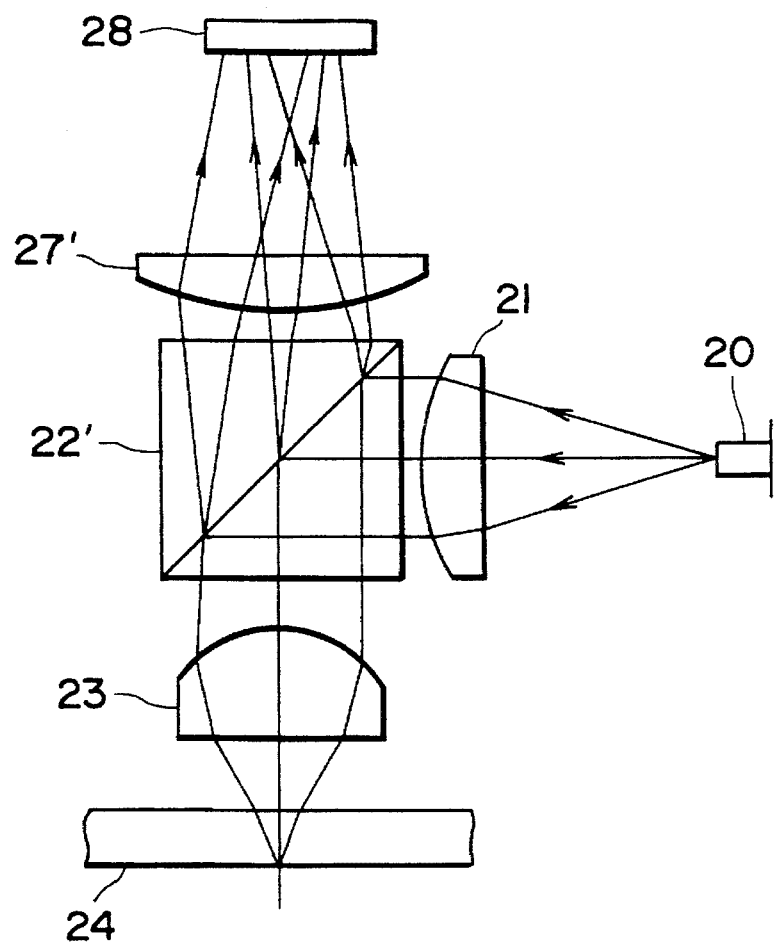

The above embodiment and modifications may be implemented by an optical medium which forms a beam splitter 22' as shown in FIG. 8.

in FIG. 8, the light beam from the laser 20 is collimated by the collimating lens 21 and reflected by a reflection plane of the beam splitter 22'. The incident light beam is a perfectly linearly polarized beam, and there is no difference in the effect whether the optical medium of the beam splitter 22' is isotropic, such as glass, or bi-refractive, such as quartz. The light beam reflected by the opto-magnetic medium 24 again passes through the beam splitter 22'. If the second prism is made of a uniaxial crystal having a crystal axis appropriately oriented, the light beam is separated into two linearly polarized beams, which are directed to the sensor 28 through a sensor lens 27' and are differentially detected thereby. The crystal axis may form an angle of 45° to the vertical direction in the drawing and is rotated approximately 45° with respect to the plane of the drawing (the virtual plane).

Figure 23:
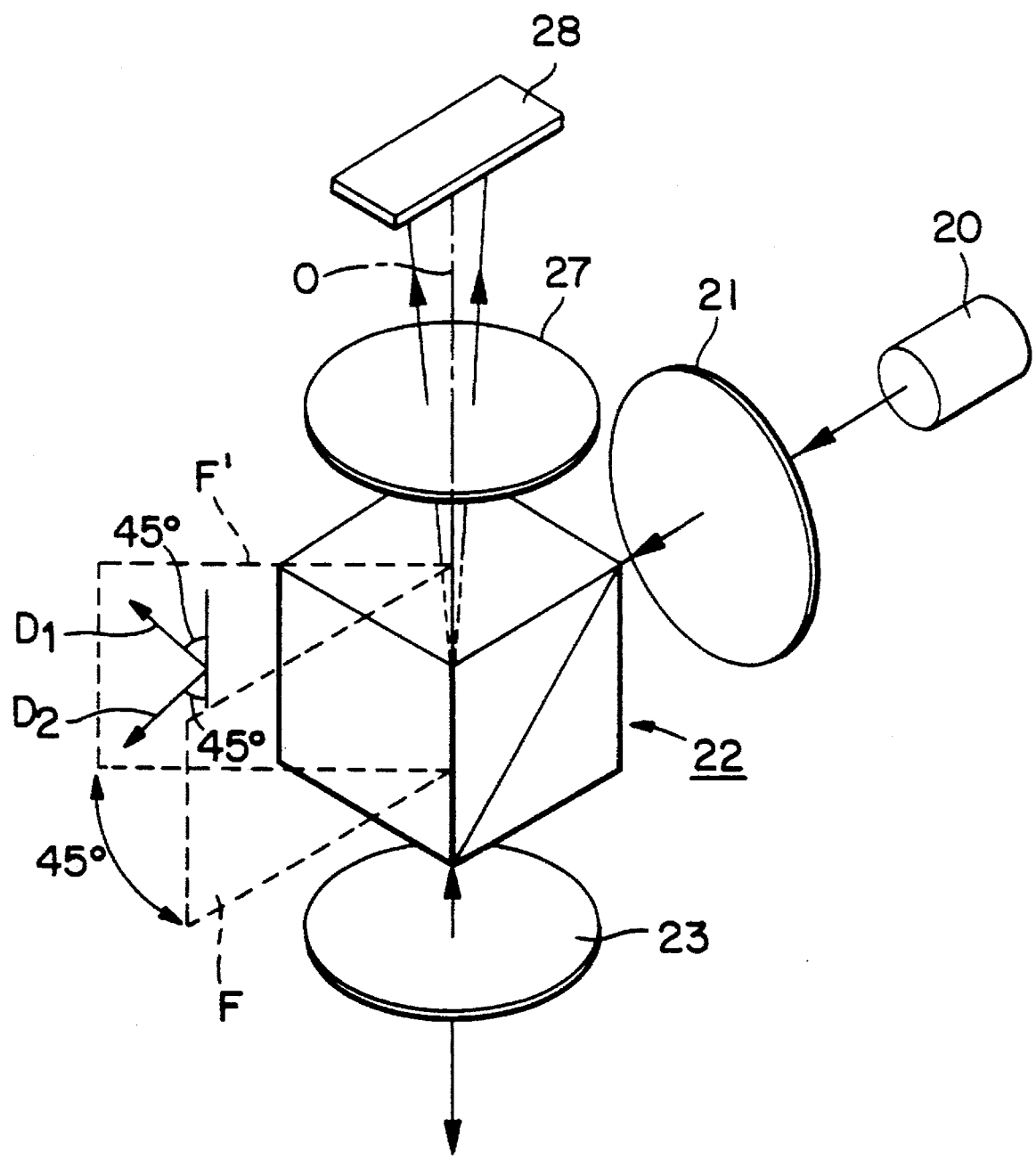
FIG. 23 is a perspective view of prism 22'.

As seen from FIG. 23, the vertical plane which includes an optical axis of a light beam emitted from a light source and an optical axis of a light beam reflected by the opto-magnetic medium, is indicated by reference character F. Since the crystal axis of the prism is rotated by 45° with respect to the virtual plane F, the crystal axis is parallel with a plane (not shown) perpendicular to a plane F' or the plane of the drawing in FIG. 23. The crystal axis may form an angle of 45° to the vertical direction of the drawing in FIG. 8, namely, in the direction of the optical axis zero shown in FIG. 23. Accordingly, the crystal axis of the prism is directed to the direction $D_1$ or the direction $D_2$ shown by the arrow in FIG. 23.

While the Wollaston prism or the single prism was shown as means for separating the light beam by the difference between polarization status of the incident light beam, the embodiment of the separation means is not limited thereto but may be a Rochon prism or a Senarmont prism, etc. The crystal parallel plates or convex lens is shown as means for creating a converging or a diverging light beam depending on the difference in polarization status, although that means may instead be a combination of convex and concave telescopic lenses or other means.

Figure 9:
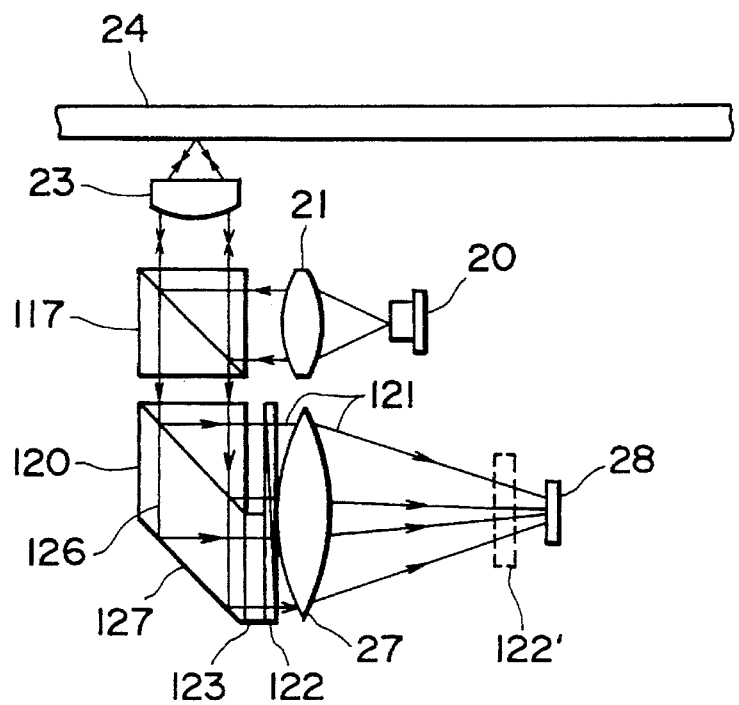
FIG. 9 shows a second embodiment of the optical pickup of the present invention.

FIG. 9 shows a second embodiment of the optical pickup of the present invention. The light beam emitted from the LD 20 is collimated by a collimating lens 21, reflected by a first beam splitter 117 and focused by the object lens 23 to a fine spot on the recording medium 24. The reflection light from the recording medium 24 again passes through the object lens 23 and the first beam splitter 117, is directed to a second beam splitter 120 and is split thereby into two light beams. The first split beam 121, reflected by the second beam splitter 120, passes through a polarization element 122 such as a polarization plate and is focused by the focusing lens 27 onto the photo-sensor 28. The same effect may be attained when the polarization element 122 is arranged between the focusing lens 27 and the photo-sensor 28. On the other hand, the second split beam 126, after passing through the second beam splitter 120, is reflected by a reflection area 127 at the bottom of the beam splitter 120, passes through the half-wavelength plate 123 and the polarization element 122, and is focused by the focusing lens 27 onto the photo-sensor 28.

The photo-sensor 28 is arranged at a position spaced from a focal plane on which the split light beams 121 and 126 are focused by the focusing lens 27. The photo-sensor 28 has 12 photo-sensing areas as shown in FIG. 1B.

A principle for detection of the AF and AT signal and the differential detection of the information signal in the apparatus of FIG. 9 is now explained.

Figure 10:
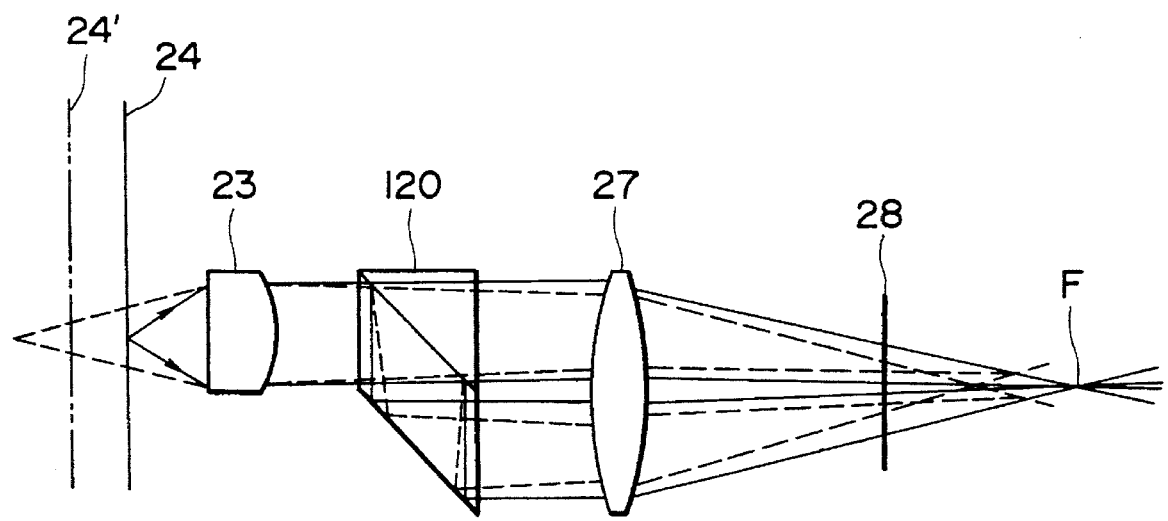
FIG. 10 illustrates a principle of detection of an AF signal by the present invention, FIG. 11, consisting of FIGS. 11A, 11B and 11C, illustrates a principle of detection of an AT signal by the present invention, FIG. 12, consisting of FIGS. 12A and 12B, illustrates a principle of detection of an information signal by the present invention.

FIG. 10 shows the principle of detection of the AF signal. Only those of the elements shown in FIG. 9 which are necessary for the AF detection are shown in FIG. 10. When the recording medium 24 is located on the focal plane of the object lens 23, the light beam is directed as shown by solid lines and focused to a focal point F of the focusing lens 27. When the recording medium moves away from the focal plane of the object lens 23, the light beam is focused at a forward side of the optical axis of the focusing lens 27 as shown by broken lines. When the recording medium moves closer from the focal plane of the object lens 23, the light beam is focused beyond the optical axis of the focusing lens 27. Accordingly, when the optical sensor 28 is arranged off the point F, the distribution of the intensity of the split light beams on The optical sensor 28 appears reduced or enlarged on the sensor depending on the position of the recording medium.

When the photo-sensor 28 has twelve photo-sensing areas, the operation is as follows. The light beam of the photo-sensor in the in-focus state of the object lens 23 and the recording medium 24 is shown by the hatched area.

The AF error signal $I_{AF}$, is given by $$I_{AF}=(I_A+I_B+I_E+I_F+I_G+I_H+I_K+I_L)-(I_C+I_D+I_I+I_J)$$

where $I_A$, $I_B$, $I_C$, $I_D$, $I_E$, $I_F$, $I_G$, $I_H$, $I_I$, $I_J$, $I_K$ and $I_L$ are outputs from the photo-sensing areas.

For the photo-sensor having concentric photo-sensing areas as shown in FIG. 1C, the AF error signal $I_{AF}$ is given by $$I_{AF}=(I_A+I_B+I_E+I_F)-(I_C+I_D+I_G+I_H)$$

where $I_A$, $I_B$, $I_C$, $I_D$, $I_E$, $I_F$, $I_G$ and $I_H$, are outputs from the photo-sensing areas.

The AF error signal may be obtained by the operation for only one side of light beams. In the example of FIG. 1B, $$I_{AF}=(I_A+I_B+I_E+I_F)-(I_C+I_D)$$

The principle of detection of the AT signal is now explained.

Figures 11A, 11B, 11C:
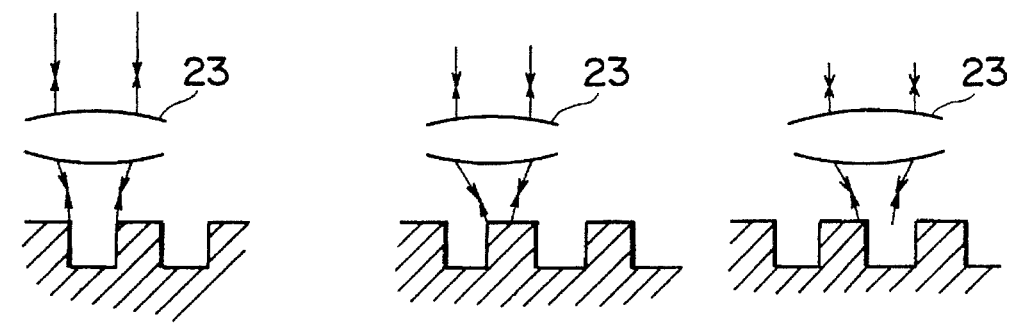

A groove having a depth of approximately ⅛ of the wavelength is formed in a vicinity of the surface of the recording medium 24 and the signal is recorded or reproduced while the groove is used as a guide. A far field pattern formed by the light beam which is reflected by the groove and again passes through the object lens 23 changes with a positional relationship between the light spot and the groove. This is illustrated in FIGS. 11A, 11B, and 11C. The upper part of FIGS. 11A, 11B, and 11C shows the positional relationship between the groove and the light spot, and the lower part shows an intensity distribution of the far field pattern.

For the split sensor shown in FIG. 1B, if the direction T-T' is aligned to the direction of the groove (the direction of the signal track), the AT error signal $I_{AT}$ is given by $$I_{AT}=(I_A+I_C+I_E+I_G+I_I+I_K)-(I_B+I_D+I_F+I_H+I_J+I_L)$$

For the split sensor shown in FIG. 1C, $$I_{AT}=(I_A+I_C+I_E+I_G)-(I_B+I_D+I_F+I_H)$$

The AT error signal may also be obtained by the operation of the output of the photo-sensing areas which sense only one of the beams.

The differential detection of the information signal by the opto-magnetic method is now explained.

Figures 12A, 12B:
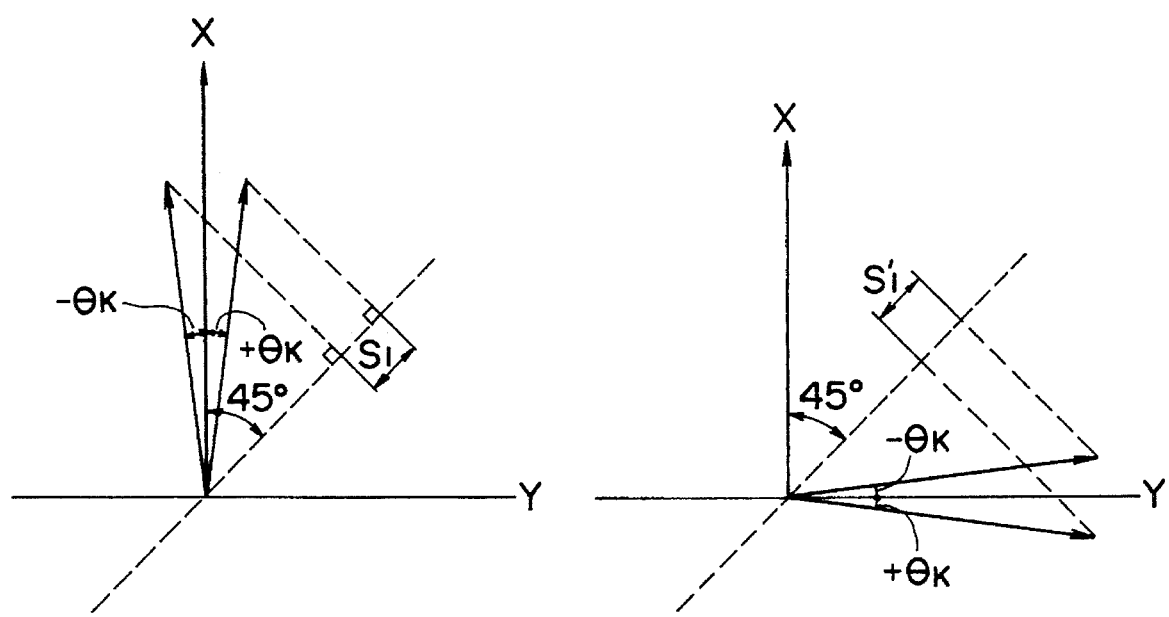

In FIGS. 12A and 12B, the X axis represents the direction of the plane of polarization of the light beam directed to the recording medium 24, and the Y axis represents a direction orthogonal thereto.

The light beam reflected from the recording medium 24 has the polarization plane thereof inclined by a small angle $\theta_K$ by the magneto-optical effect as shown in FIG. 12A. This inclination is clockwise or counterclockwise ($\theta_K$ or $-\theta_K$) relative to a vertical direction of magnetic domain, and the angle is approximately 1°.

The light beam 121 reflected by the beam splitter 120 of FIG. 9 passes through the polarization element. If the transmission axis of the polarization element 122 is inclined approximately 45° with respect to the X axis, the following signal component in the intensity is produced in FIG. 12 depending on the inclination of the polarization plane:

$$S_1 \{\cos (45°-\theta K)\}-\{\cos (45°-\theta K)\}$$

The second split beam 126 passes through the half-wave plate 123 before it passes through the polarization element 122. Accordingly, the polarization direction of the light beam 126 makes an angle of 90° with the light beam 121 as shown in FIG. 12B.

Accordingly, after it passed through the polarization element 122, the signal component in the intensity is $$S_1 \{\cos (45°-\theta K)\}-\{\cos (45°-\theta K)\}$$

The signal $S_1$ and $S_1$ show only the P—P components for the sake of convenience. As seen from FIGS. 12A and 12B, the light beam 121 has a maximum signal amplitude and the light beam 126 has a minimum signal amplitude for the rotation of angle of $\theta K$.

When the rotation of the polarization plane is detected by the opto-magnetic signal by the arrangement shown in FIG. 9, the intensity modulation derived from the light beams 121 and 126 is reversed in phase. Accordingly, for FIG. 1B, the information signal $I_S$ is given by $$I_S=(I_A+I_B+I_C+I_D+I_E+I_F)-(I_G+I_H+I_I+I_J+I_K+I_L)$$

and, for FIG. 1C, $$I_S=(I_A+I_B+I_C+I_D)-(I_E+I_F+I_G+I_H)$$

and the information signal is differentially detected.

To compare the arrangement of the present invention shown in FIG. 9 with the arrangement of the prior art, the arrangement is advantageous to reduce size and cost.

Figure 13:
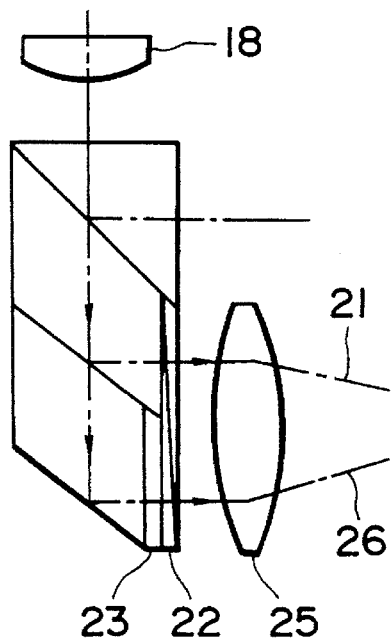
FIGS. 13, 14, 15 and 16 show a modification of the second embodiment of the optical pickup shown in FIG. 9.
Figure 14:
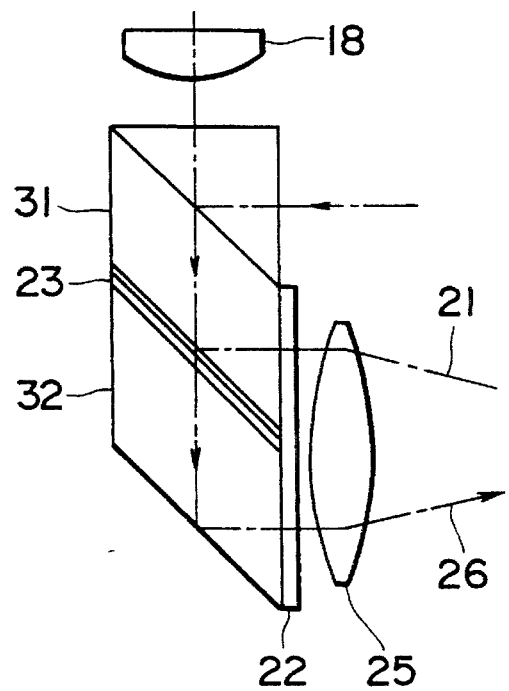

By integrating the optical elements shown in FIG. 9, the optical adjustment during assembly is facilitated, and misalignment of axes during use is prevented and a highly reliable optical pickup is provided. For example, in FIG. 13, the beam splitters 117 and 120, half-wave plate 123 and polarization element 122 are integrated by bonding material. In FIG. 14, the half-wave plate is arranged immediately behind the reflection plane of the beam splitter 120. In this case, parallelogram blocks 31 and 32 of the same size may be used and the preparation of the elements is simplified.

Figure 15:
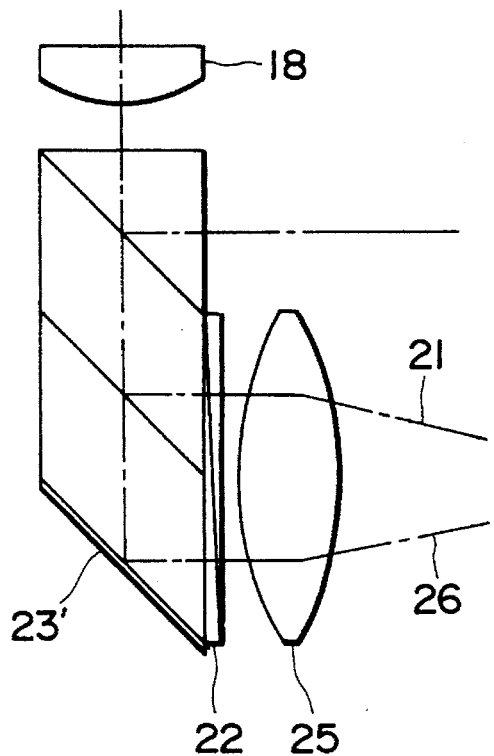
Figure 16:
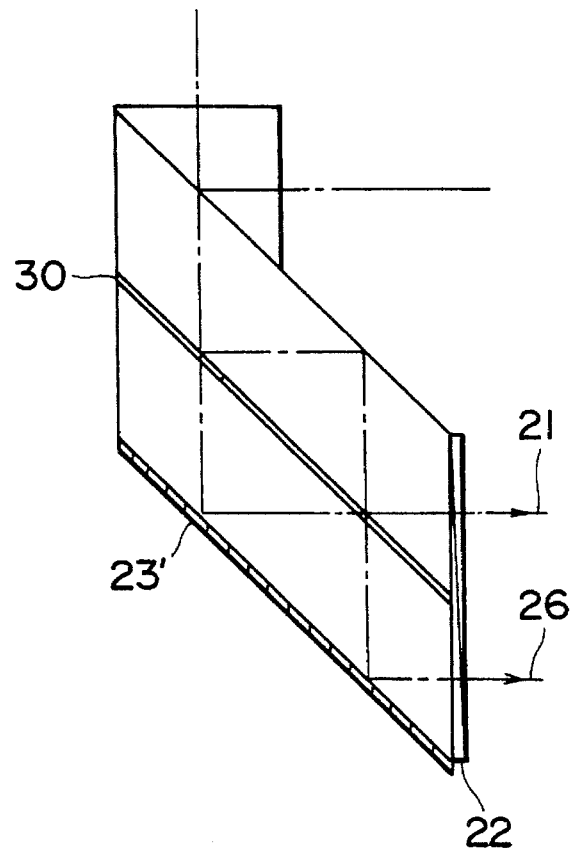

As shown in FIG. 15, a dielectric film or metal film 23' may be formed on the reflection plane 127 for the second light beam 126 to rotate the polarization plane instead of using the half-wave plate 123. In FIG. 16, a desired rotation angle is attained by a number of times of reflection when it is difficult to rotate the polarization plane by 90° by one reflection.

In order to detect the AF and AT error signals and the information signal, it is necessary to process the signals generated by the photo-sensing areas. When the differential amplifier for such processing is incorporated in the photo-sensor together with the photo-sensing areas, signal detection which is resistant to external noise is attained.

Figure 17:
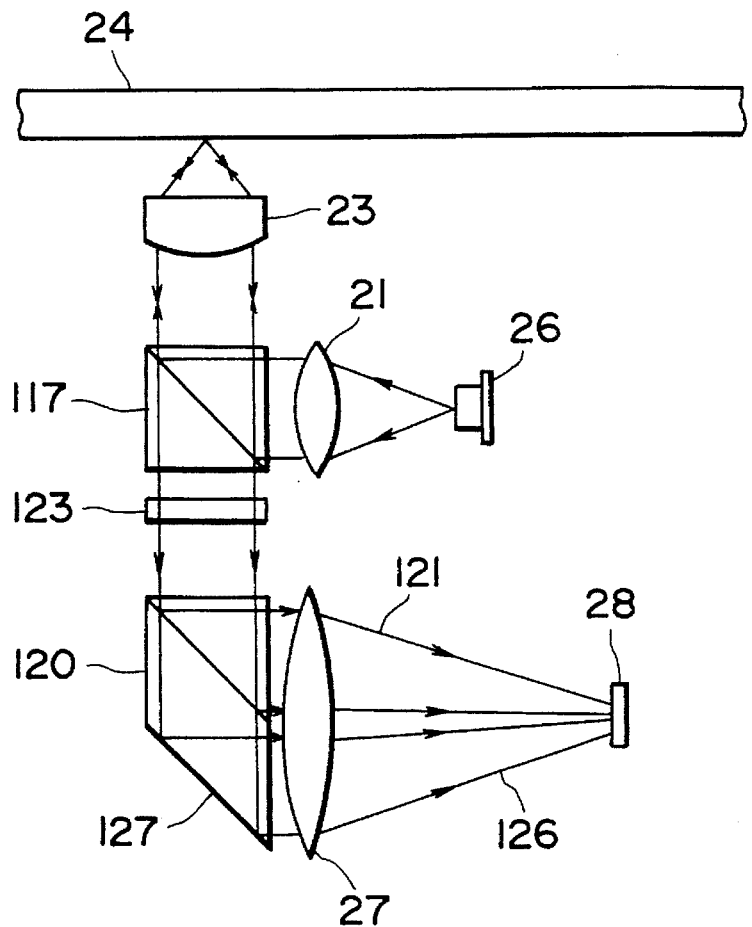
FIG. 17 shows a third embodiment of the optical pickup of the present invention.

FIG. 17 shows a third embodiment of the optical pickup of the present invention. The light beam emitted from the LD 26 is collimated by the collimater lens 21, reflected by the first beam splitter 117 and focused by the object lens 23 to a fine spot on the recording medium 24. The reflection beam from the recording medium 24 again passes through the object lens 23, passes through the first beam splitter 117 and the half-wave plate 123 with the direction of polarization plane being rotated by 45°, and is directed to the second beam splitter 120 by which the beam is split into two beams. One split beam 121 reflected by the other beam splitter 120 is focused by the focusing lens 27 to the photo-sensor 28. On the other hand, the second split beam 126 is reflected by the reflection area 127 at the bottom of the beam splitter 120 and condensed by the condenser lens to the photo-sensor 28.

The photo-sensor 28 is arranged at a position spaced from a focal plane on which the split beams 121 and 126 are focused by the focusing lens 27. The photo-sensor 28 has twelve photo-sensing areas on the photo-sensing plane as shown in FIG. 1B.

The principle of the detection of the AF and AT error signals and the differential detection of the information signal in the arrangement of FIG. 17 applies equally to the second embodiment.

The differential detection of the information signal by the opto-magnetic method is now explained.

In FIG. 17, the reflection light from the recording medium 24 has the polarization plane thereof rotated by $\theta K$ or $-\theta K$ by the magnetic pattern (upward or downward orientation of magnetic domain) by the magneto-optical effect, and it is directed to the half-wave plate 123. The half-wave plate 123 has its crystal axis inclined to the incident plane of the beam splitter 120 by 22.5°. When the transmission and reflection characteristics of the beam splitter 120 are assumed as the polarization beam splitter characteristic (P component: 100% transmission, S component: 100% reflection), the transmitted and reflected light beams are detected by the photo-sensor as the signals having opposite phases, as shown in FIG. 18.

Figure 18:
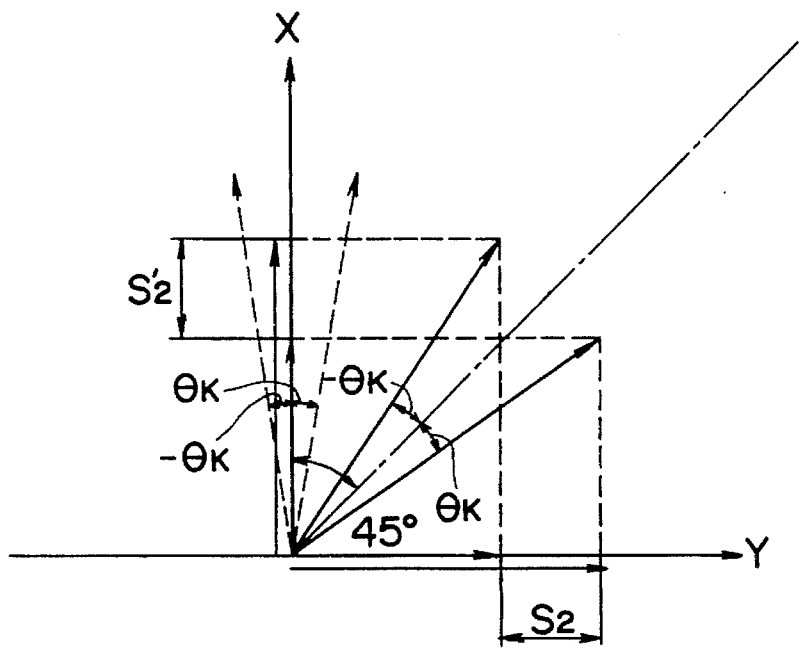
FIG. 18 illustrates a principle of detection of the information signal by the present invention.

In FIG. 18, the X axis represents the reflection component of the polarization beam splitter, and the Y axis represents the transmission component. The light beam rotated by $\theta K$ or $-\theta K$ from the polarization plane of the incident light to the recording medium (the broken lines in FIG. 18 show the polarization plane) has its polarization plane rotated by 45° by the half-wave plate. Thereafter, it is reflected, transmitted and split by the polarization beam splitter 120. Thus, the two beams have the same variation amplitude ($S_2$, $S_2$) and opposite phases. By detecting those two light beams using the photo-sensor 28, the information recorded on the recording medium can be read. In the photo-sensor of FIG. 1B, the opto-magnetic information signal $I_S$ is given by $$I_S=(I_A+I_B+I_C+I_D+I_E+I_F)-(I_G+I_H+I_I+I_J+I_K+I_L)$$

For the photo-sensor of FIG. 1C, $$I_S=(I_A+I_B+I_C+I_D)-(I_E+I_F+I_F+I_G)$$

Figure 19:
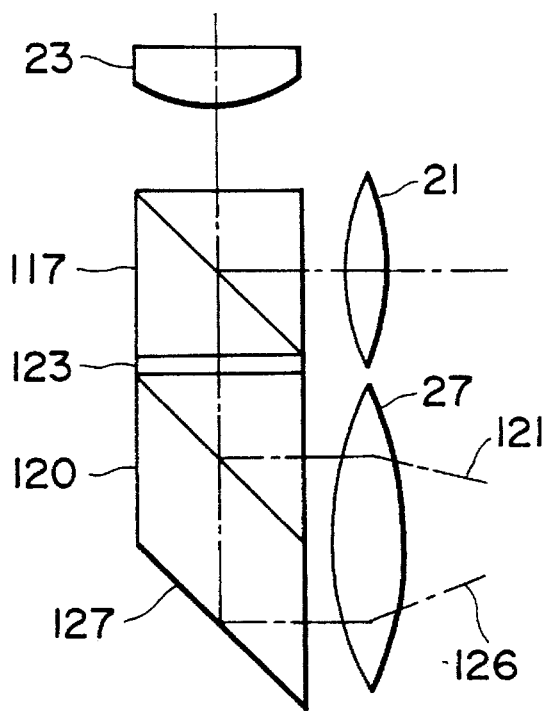
FIGS. 19 and 20 show modifications of the optical pickup of FIG. 17, FIGS. 21 (consisting of FIGS. 21A and 21B) and 22 (consisting of FIGS. 22A, 22B and 22C) illustrate principles of differential detection.
Figure 20:
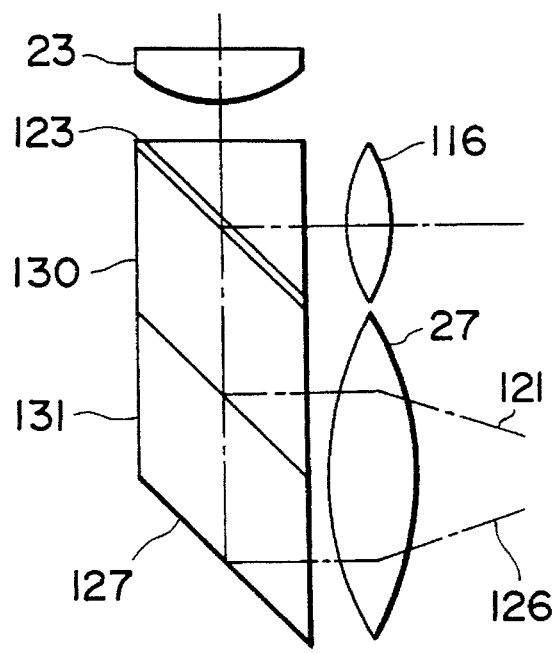

By integrating the optical elements of FIG. 17, the optical adjustment during the assembly is facilitated, misalignment of axes during use is prevented, and a highly reliable optical pickup is provided. For example, in FIG. 19, the beam splitter 117, half-wave plate 123 and beam splitter 120 are integrated by bonding material. In FIG. 20, the half-wave plate 123 is arranged immediately behind the reflection plane of the beam splitter 117. In this case, parallelogram blocks 130 and 131 of the same size may be used and the preparation of the elements is simplified.

in order to detect the AF and AT error signals and the information signal, it is necessary to process the signals generated by the photo-sensing areas. By incorporating the processing differential amplifier in the photo-sensor together with the photo-sensing areas, signal detection which is resistive to external noise is attained.

In the present embodiment, the variation of the signals generated by the photo-sensing areas of the sensor is detected to improve the precision.

Figure 21A:
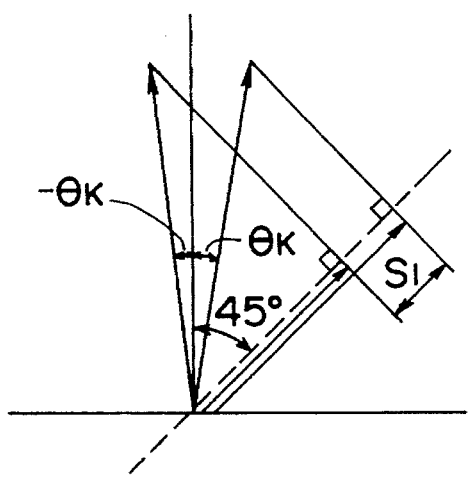
Figure 21B:
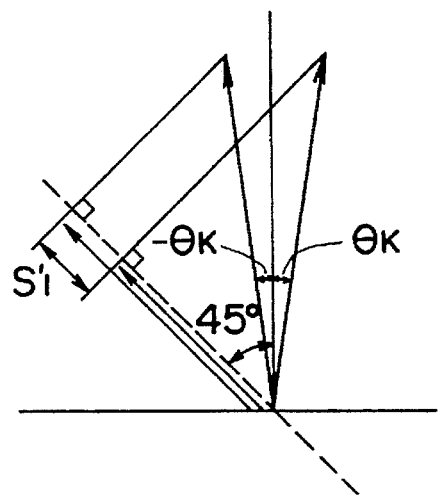
Figure 22A:
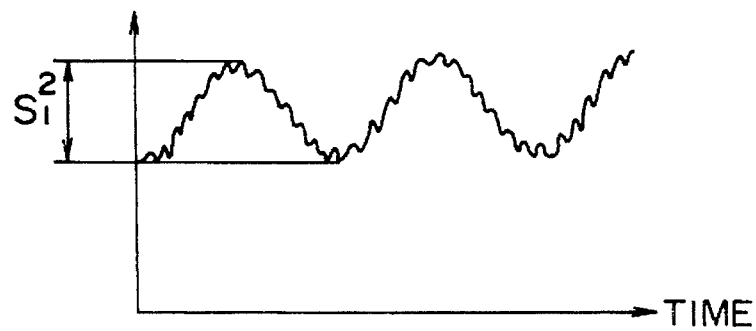
Figure 22B:
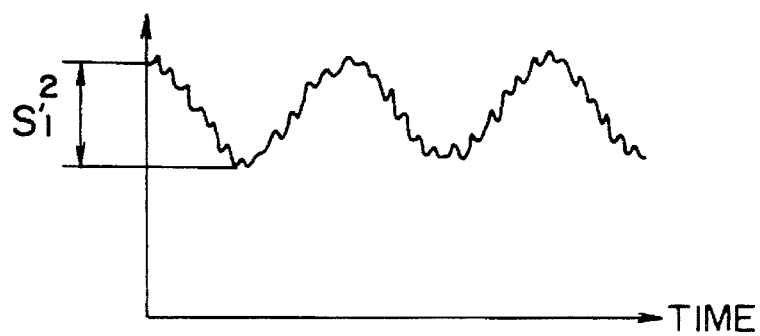
Figure 22C:
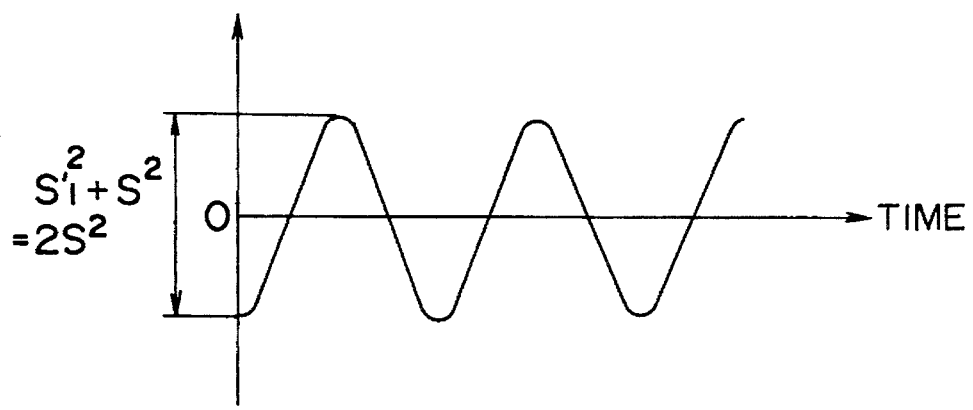

The advantage of the differential detection is explained with reference to a third embodiment. FIGS. 21A and 21B show signal amplitudes generated by the sensing areas of the sensor. The light beam reflected by the recording medium 24 having a longitudinal axis along the polarization direction of the incident light beam has its polarization plane rotated by $\theta K$ or $-\theta K$ depending on the orientation (up or down) of the axis of the opto-magnetic pattern. Since the combination of the half-wave plate 123 and the polarization beam splitter 120 is equivalent to a system having a polarization plate whose transmission axis is inclined by 45°, difference $S_1$ and $S'_1$ of the projection component to a virtual transmission axis (broken line axis inclined by 45°) are signal amplitudes. Since $\theta K$ and $-\theta K$ vary with time depending on the optomagnetic pattern, the signal intensity changes are represented by the light beams shown in FIGS. 22A and 22B, which are shifted by 180° in phase from each other. The opto-magnetic signal generated by the sensing areas of the photo-sensor is reversed in phase but noise components (noise from the recording medium and swing noise of the LD light) usually ride on those signals and the noise components are of the same phase.

Accordingly, when the signals from the sensing areas of The sensor are differentially detected, the signal components are added and the noise components are cancelled. If the optical system is precisely arranged, the signal components $S_1^2$ and $S'_1^2$ from the respective sensors are equal and the noise amplitudes are also equal. Accordingly, the signal is doubled and the noise is cancelled. Thus, the differential detection provides a high S/N signal.

As described herein above, in accordance with the present invention, the light beam from the recording medium is split and the split light beams are differentially detected by the single photo-detector having the split photo-sensing plane. Accordingly, 1. The optical pickup can be constructed in a compact size.
2. The S/N ratio of the signal detection is improved by the differential detection.
3. The number of components is reduced and the cost is reduced.
4. By integrating the components, a more reliable pickup is provided.
5. Because only one photo-sensor is used, no consideration of the variation of the characteristics between the sensors is required, and the position adjustment is simple.
6. By arranging the signal processing circuit on the same chip as the photo-detector, signal detection which is resistive to external noise is attained.

We claim:

1. An optical pickup apparatus comprising:

light projection means for projecting a light beam generated by a light source onto a recording medium;

light separation means for separating a light beam reflected by the recording medium into first and second light beams;

light converging means for respectively converging the first and second light beams;

a first detector and a second detector, formed on a common substrate, for detecting the first and second light beams, respectively, and for producing detection outputs, a light receiving portion of each of said first and second detectors being divided into a plurality of areas for respectively detecting an area of a spot of light produced by the first and second light beams, wherein one of said first and second light receiving portions is located before a focusing position of one of the first and second light beams and the other light receiving portion is located after a focusing position of the other light beam; and processing means for obtaining a focusing error signal on the basis of the outputs of said first and second detectors.

2. An apparatus according to claim 1, wherein the first and second light beams separated by said light separation means are different with respect to each other in their light polarization state.

3. An apparatus according to claim 1, wherein said processing means obtains an information signal on the basis of outputs of said first and second light receiving portions.

4. A light pickup apparatus comprising:

light projection means for projecting a light beam generated by a light source onto a recording medium;

means for separating a light beam reflected by the recording medium into first and second light beams, and for respectively converging the first and second light beams;

a first detector and a second detector, formed on a common substrate, for detecting the first and second light beams, respectively, a light receiving portion of each of said first and second detectors being divided into a plurality of areas for respectively detecting an area of a spot of light produced by the first and second light beams, wherein one of the first and second light beams is focused before the light beam reaches one of the first and second light receiving portions and the other light beam reaches the other light receiving portion after being focused; and means for obtaining a focusing error signal on the basis of the outputs of said first and second detectors.

5. An optical pickup apparatus comprising:

a light irradiation optical system for irradiating a recording medium with a light beam generated by a light source;

light separation means for separating a light beam reflected by the recording medium into first and second light beams;

light converging means for respectively converging the first and second light beams;

a first detector provided before a focusing position of the first light beam;

a second detector provided after a focusing position of the second light beam, said second detector being formed on a substrate on which the first detector is formed; and detecting means for detecting a focusing error signal of said light irradiation optical system from outputs of said first and second detectors.

6. An apparatus according to claim 5, wherein said first and second detectors respectively have light receiving portions each of which is divided into a plurality of regions.

7. An apparatus according to claim 5, wherein a polarization state of the first light beam is different from that of the second light beam.

8. An apparatus according to claim 5, wherein said detecting means further detects an information signal of the recording medium on the basis of the outputs of said first and second detectors.

9. An optical pickup apparatus comprising:

a light irradiation optical system for irradiating a recording medium with a light beam generated by a light source;

a light converging optical system for separating a light beam reflected by the recording medium into first and second light beams and for respectively converging the first and second light beams;

a first detector provided before a focusing position of the first light beam;

a second detector provided after a focusing position of the second light beam, said second detector being formed on a substrate on which the first detector is formed; and detecting means for detecting a focusing error signal of said light irradiation optical system from outputs of said first and second detectors.

10. An apparatus according to claim 9, wherein said first and second detectors respectively have light receiving portions each of which is divided into a plurality of regions.

11. An apparatus according to claim 9, wherein a polarization state of the first light beam is different from that of the second light beam.

12. An apparatus according to claim 9, wherein said detecting means further detects an information signal of the recording medium on the basis of the outputs of said first and second detectors.

* * * * *

UNITED STATES PATENT AND TRADEMARK OFFICE
CERTIFICATE OF CORRECTION

PATENT NO. : 5,488,598
DATED : January 30, 1996
INVENTOR(S) : KIYONOBU ENDO ET AL.

It is certified that error appears in the above-identified patent and that said Letters Patent is hereby corrected as shown below:

ON THE TITLE PAGE:

AT [57] ABSTRACT

Line 5, "guide" should read --to guide--.

COLUMN 4

Line 30, "embodiment" should read --embodiments--.

COLUMN 6

Line 45, "$S_1 - \{\cos(45°-\theta K)\} - \{\cos(45°-\theta K)\}$" should read --$S_1^2 \{\cos(45°-\theta K)\}^2 - \{\cos(45°-\theta K)\}^2$--.

Line 54, "$S_1 \{\cos(45°-\theta K)\} - \{\cos(45°-\theta K)\}$" should read --$S_1'^2 \{\cos(45°-\theta K)\}^2 - \{\cos(45°-\theta K)\}^2$--.

Line 56, "signal $S_1$ and $S_1$" should read --signal $S_1^2$ and $S_1'^2$--.

UNITED STATES PATENT AND TRADEMARK OFFICE
CERTIFICATE OF CORRECTION

PATENT NO. : 5,488,598
DATED : January 30, 1996
INVENTOR(S) : KIYONOBU ENDO ET AL.

Page 2 of 2

It is certified that error appears in the above-identified patent and that said Letters Patent is hereby corrected as shown below:

COLUMN 8

Line 10, "$(S_2, S_2)$" should read --$(S_2', S_2)$--.

Signed and Sealed this

Ninth Day of July, 1996

BRUCE LEHMAN

Attest:

Attesting Officer

Commissioner of Patents and Trademarks